United States Patent
Servant et al.

(10) Patent No.: US 11,454,135 B2
(45) Date of Patent: Sep. 27, 2022

(54) DEVICE FOR CENTRING AND GUIDING IN ROTATION A ROTATING PART WITH INTERLACED ARMS

(71) Applicant: Safran Aircraft Engines, Paris (FR)

(72) Inventors: Régis Eugène Henri Servant, Moissy-Cramayel (FR); Didier Gabriel Bertrand Desombre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 8 days.

(21) Appl. No.: 17/294,335

(22) PCT Filed: Nov. 14, 2019

(86) PCT No.: PCT/FR2019/052699
§ 371 (c)(1),
(2) Date: May 14, 2021

(87) PCT Pub. No.: WO2020/099786
PCT Pub. Date: May 22, 2020

(65) Prior Publication Data
US 2022/0010688 A1    Jan. 13, 2022

(30) Foreign Application Priority Data
Nov. 16, 2018    (FR) ...................................... 1860611

(51) Int. Cl.
*F01D 25/16*    (2006.01)
*F16C 27/04*    (2006.01)
(Continued)

(52) U.S. Cl.
CPC ......... *F01D 25/164* (2013.01); *F01D 21/045* (2013.01); *F16C 27/045* (2013.01);
(Continued)

(58) Field of Classification Search
CPC ... F16F 1/324; F16F 1/34; F16C 27/04; F16C 27/045; F16C 2360/23; F01D 25/164
See application file for complete search history.

(56) References Cited

U.S. PATENT DOCUMENTS 3,709,570 A * 1/1973 Galbato .................. F16C 27/04
                                                                      384/536
9,708,931 B2 * 7/2017 Servant ................. F01D 21/045
(Continued)

FOREIGN PATENT DOCUMENTS

DE    102020206588 A1 *  6/2021
EP       1630357 A2     3/2006
(Continued)

OTHER PUBLICATIONS

French Search Report for French Application No. 1860611, dated Aug. 6, 2019.
(Continued)

*Primary Examiner* — Topaz L. Elliott
(74) *Attorney, Agent, or Firm* — Birch, Stewart, Kolasch & Birch, LLP

(57) ABSTRACT

The invention concerns a device for centring and guiding in rotation a rotating part rotating about a turbomachine axis, comprising a rolling bearing comprising an outer ring, a bearing support surrounding the outer ring, an annular attachment flange mounted on the bearing support and a flexible portion connecting the outer ring to the attachment flange and comprising first arms extending from the attachment flange in a first direction with a first radial component towards the inside, second arms extending from the outer ring of the rolling bearing in a second direction with a second radial component opposite the first radial component, towards the outside, and an annular base that the first (Continued)

arms and the second arms join; the first arms alternating circumferentially with the second arms.

9 Claims, 2 Drawing Sheets

(51) Int. Cl.
  *F01D 21/04* (2006.01)
  *B33Y 80/00* (2015.01)
(52) U.S. Cl.
  CPC .......... *B33Y 80/00* (2014.12); *F05D 2230/64* (2013.01); *F05D 2240/54* (2013.01); *F05D 2260/30* (2013.01); *F16C 2360/23* (2013.01)

(56) References Cited

U.S. PATENT DOCUMENTS

| | | | | |
|---|---|---|---|---|
| 2008/0152483 | A1* | 6/2008 | Godleski | F01D 25/164 |
| | | | | 415/142 |
| 2010/0027930 | A1* | 2/2010 | Kinnaird | F02C 7/06 |
| | | | | 384/523 |
| 2010/0142871 | A1* | 6/2010 | Udall | F16C 19/54 |
| | | | | 384/223 |
| 2012/0213629 | A1* | 8/2012 | Rouesne | F01D 25/164 |
| | | | | 415/170.1 |
| 2013/0156574 | A1 | 6/2013 | Antunes et al. | |
| 2013/0280063 | A1* | 10/2013 | Ganiger | F01D 25/164 |
| | | | | 415/229 |
| 2015/0000306 | A1* | 1/2015 | Perronnet | F01D 25/162 |
| | | | | 415/173.1 |
| 2016/0290161 | A1* | 10/2016 | Servant | F16C 33/581 |
| 2017/0089220 | A1* | 3/2017 | Carter | F01D 25/164 |
| 2017/0145855 | A1* | 5/2017 | Ganiger | F16C 27/045 |
| 2019/0048743 | A1* | 2/2019 | Tulej | F16F 15/022 |
| 2019/0145277 | A1* | 5/2019 | Ghosh | F16C 19/06 |
| | | | | 384/223 |
| 2020/0141275 | A1* | 5/2020 | Anglin | F16C 27/045 |
| 2021/0062718 | A1* | 3/2021 | Bessy | F16C 27/066 |
| 2021/0131304 | A1* | 5/2021 | Kiely | F16F 15/0237 |
| 2021/0348522 | A1* | 11/2021 | Demitraszek, Sr. | F01D 25/164 |

FOREIGN PATENT DOCUMENTS

| | | |
|---|---|---|
| EP | 3115564 A1 | 1/2017 |
| FR | 2960907 A1 | 12/2011 |

OTHER PUBLICATIONS

International Search Report and Written Opinion of the International Searching Authority for International Application No. PCT/FR2019/052699, dated Mar. 26, 2020.

* cited by examiner

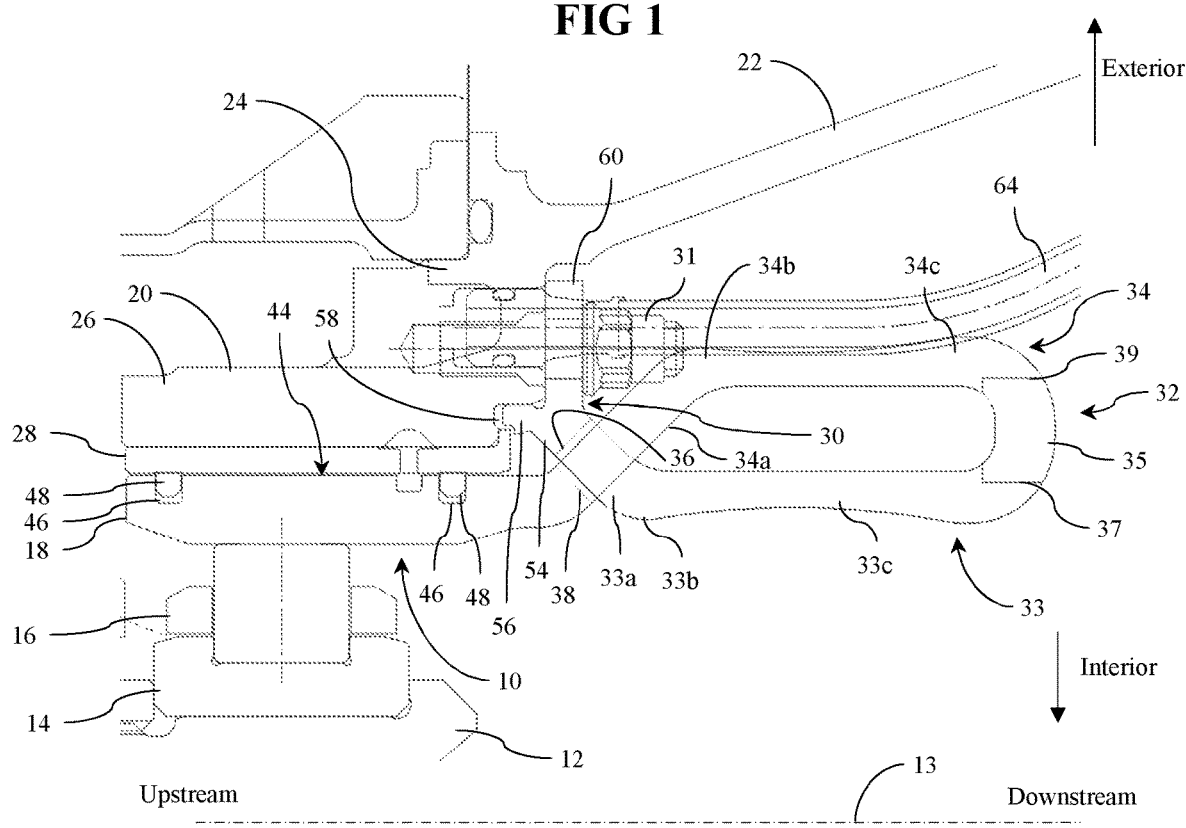

DEVICE FOR CENTRING AND GUIDING IN ROTATION A ROTATING PART WITH INTERLACED ARMS

GENERAL TECHNICAL FIELD

The present invention relates to the field of turbomachines, especially for aircraft, and more particularly to a device for centring and guiding in rotation a rotating part of a turbomachine comprising a rolling bearing, said bearing comprising a flexible elastic part intended to ensure its suspension. Such a bearing is currently called a flexible bearing.

PRIOR ART

A flexible bearing comprises an attachment flange mounted on the bearing support and a flexible part connecting the outer ring of the bearing to the attachment flange. The flexible part of the flexible bearing, generally called flexible cage or squirrel cage, is most often constituted by a plurality of machined arms, or thin columns, located between the attachment flange of the bearing on the bearing support, and the bearing proper.

The need for flexibility dictates the length of these arms. The longer the arms, the more flexible the bearing, and the weaker the constraints in the arms. But the bearing becomes bulky in an axial sense. The solution generally used to decrease the axial bulkiness of the bearing is to install U-shaped arms, which decreases the axial bulkiness of the flexible part by around half. This is generally done on a roller bearing which transmits no or little axial force, and which can therefore accept only some of the arms working in slight compression.

Also, to further reduce the bulkiness relative to the U-shaped arms, patent application EP3115564A1 proposes circumferential offsetting between parts of the internal arms extending axially between the rolling bearing and an annular base, and parts of external arms extending axially between the attachment flange and the annular base.

However, presupposing the occurrence of an event such as the loss of a fan blade, or else seizure of the bearing due to lack of oil, substantial forces would be generated on the bearing, which could cause these arms to break. If no particular precaution is taken, the broken arms can no longer ensure that the ring of the bearing is held in place, whether axially or tangentially. The rolling function is no longer ensured, causing rapid degradation of the bearing and surrounding pieces. The bearing can no longer ensure operating phases of the motor such as operating as windmill.

Different solutions have been proposed to ensure axial retention of the outer ring of the bearing relative to the support of the bearing even when the elastically deformable elements which connect the outer ring of the bearing to the bearing support are broken.

A known solution consists of interposing axial retaining means of the outer ring between the bearing support and an upstream end of the ring. These axial retaining means take the form of a plurality of radial feet mounted via bolts on an upstream end of the bearing support, and forming axial stops for an upstream end of the outer ring. This technical solution can be criticised in that it causes bulkiness and considerable overall mass, especially due to the need to extend the outer bearing ring upstream so as to offer a stop surface on the radial feet borne by the bearing support. Effectively, this ring extension upstream is justified by the need for the latter to extend beyond the retaining ring in which it is housed, for the purpose of receiving the radial feet borne by the bearing support enclosing the retaining ring. This extension upstream of the outer bearing ring at times proves even impossible to achieve due to problems of bulkiness in this already very dense area of the turbomachine.

Another solution proposed in document FR 2960907 consists of ensuring axial retention of the outer ring of a bearing by means of pins engaged jointly in a groove of the outer ring and in orifices of a downstream extension of the retaining ring of the bearing (see for example FIG. 3 of the cited document). However, the latter solution requires a complex assembling procedure. In fact, the pins must be mounted according to the radial direction going from the inside to the outside. Mounting the pins can be done only after the outer ring of the bearing has been mounted in its support, and the bulkiness of the latter complicates the task. Similarly, for disassembly, the pins have to be pulled out before the outer ring of the bearing can be withdrawn from its support, which presents the risk of damage to these elements. Also, for the pins to be made unlosable, the outer ring of the bearing has to be able to turn in its support, while it is already in its final axial position. Such an operation prohibits clamped mounting of the outer ring in its support, which is preferable, however.

Patent application WO 2015/079156 presents another solution, in which the axial retaining function of the bearing after breaking of the arms is ensured in both directions by fretted pins in the bearing, which cooperate with a stop ring also fretted under the attachment flange of the bearing. All the same, the bearing still has considerable radial bulkiness as well as significant weight.

PRESENTATION OF THE INVENTION

The aim of the present invention is to rectify the drawbacks of the prior art by proposing a device for centring and guiding in rotation a rotating part around an axis of a turbomachine, comprising:
  a rolling bearing comprising an outer ring radially to the outside relative to the axis;
  a bearing support radially to the outside and enclosing the outer ring;
  an annular attachment assembly of the outer ring on the bearing support, the attachment assembly comprising an annular attachment flange mounted on the bearing support and a flexible part connecting the outer ring to the attachment flange,
characterised in that the flexible part comprises:
  first arms starting out from the attachment flange in a first direction with a first radial component towards the interior in the direction of the axis;
  second arms starting out from the outer ring of the rolling bearing in a second direction with a second radial component opposite the first radial component, to the outside;
  an annular base connected to the first arms and the second arms, the first arms alternating circumferentially with the second arms,
wherein the first arms face the outer ring of the rolling bearing in an axial direction, and the second arms face the attachment flange in an axial direction.

The device is advantageously completed by the following characteristics, taken singly or in any of their technically possible combinations:
  attachments of second arms to the annular base are radially more external relative to the axis than attachments of first arms on the annular base;

the first arms comprise a first part having a first connection interface connecting said first arms to the attachment flange and extending in a radially internal direction relative to the axis facing the outer ring of the rolling bearing, a second bent part extending the first part, and a third part extending the second part and connecting to a radially internal part of the annular base;

the second arms comprise a first part having a first connection interface connecting said second arms to the outer ring of the rolling bearing and extending in a radially external direction relative to the axis facing the attachment flange, a second bent part extending the first part, and a third part extending the second part and connecting to a radially internal part of the annular base;

in describing the circumference of the annular assembly, each first arm is adjacent to two second arms and each second arm is adjacent to two first arms;

the attachment flange comprises an annular frame provided with attachment areas projecting radially to the outside relative to the axis, the attachment areas comprising holes for fastening of the attachment flange on the bearing support;

a supply tube is placed outside the annular frame between the projections of two adjacent attachment areas;

the device comprises a retaining ring interposed between the outer ring and the bearing support, and the attachment flange comprises an annular frame, said annular frame forming an axial stop of the retaining ring in the direction of the axis.

The invention also relates to a turbomachine comprising at least one device according to the invention.

The invention also relates to a process for manufacturing a device according to the invention, wherein the flexible part is produced by additive manufacturing.

PRESENTATION OF THE FIGURES

The invention will be better understood by way of the following description which relates to a preferred embodiment given by way of non-limiting example and explained with reference to the appended schematic drawings in which:

FIG. 1 is a diagram illustrating a rolling bearing of a turbomachine in axial section according to an embodiment of the invention;

FIG. 2 is a repeat of FIG. 1 after the breaking of arms of the flexible part of the rolling bearing of a turbomachine according to an embodiment of the invention;

In the figures, identical reference numerals designate similar or equivalent elements.

DETAILED DESCRIPTION

Figure 3:
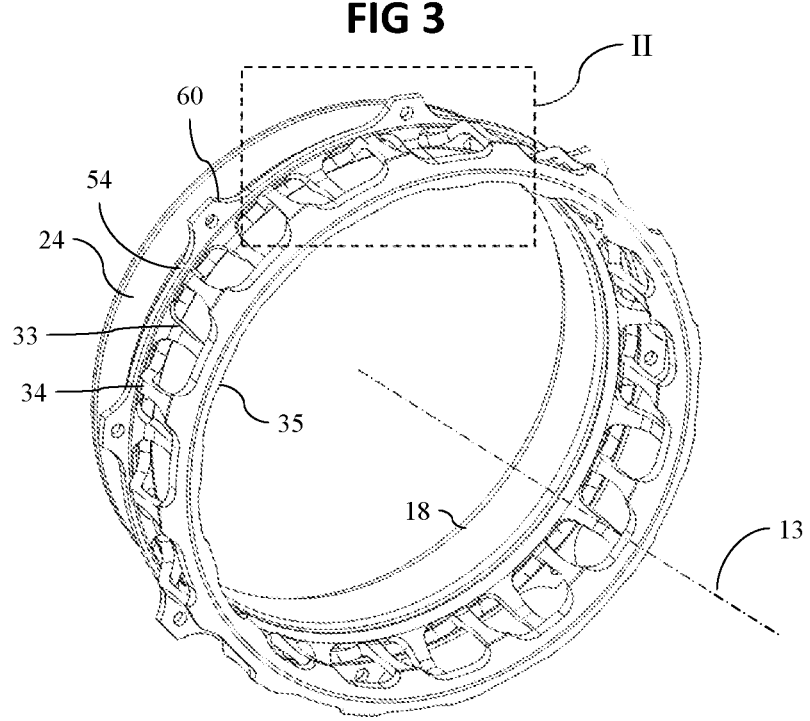
FIG. 3 is a diagram illustrating a view of the annular attachment assembly of the outer ring on the bearing support according to an embodiment of the invention.

FIG. 1 illustrates a part of a device for centring and placing in rotation a rotating part 12, such as a shaft, in a turbomachine, according to a first preferred embodiment of the invention.

In the following description the directions "upstream" and "downstream" are defined relative to a general direction of flow of gases parallel to an axis 13 of the rotary piece 12 corresponding to an axis of the turbomachine. Therefore, in FIG. 1 the upstream direction is directed towards the left of FIG. 1 and the downstream direction is directed towards the right of FIG. 1. In the same way, the radial directions "towards the interior" and "to the outside" are defined relative to the axis 13. In this way, in FIG. 1 the radially external direction is directed towards the top of FIG. 1 and the radially internal direction is directed towards the bottom of FIG. 1.

This device 10 comprises a bearing formed by an internal ring 14 connected to the rotary piece 12, a bearing 16, and an outer ring 18 connected to a bearing support 20 of overall annular form.

The bearing support 20 comprises a frustoconical wall 22 intended to be attached to a casing of the turbomachine or to another bearing support extending coaxially to the rotary piece 12, an annular flange 24 extending radially towards the interior from an upstream end of the frustoconical wall 22, and an upstream part 26 cylindrical in revolution extending towards the upstream from a radially internal end of the annular flange 24. The device 10 comprises a retaining ring 28 mounted clamped in the upstream part 26 of the bearing support 20.

This non-limiting example illustrates a bearing damped by means of a film of oil, also called "squeeze film". For this purpose, the outer ring 18 has an annular radially external surface 44 of a form overall cylindrical in revolution, and provided with two grooves 46 housing respectively two annular sealing segments 48 axially delimiting an annular space on the annular radially external surface 44 for receiving a film of oil.

The device 10 also comprises an attachment assembly of the outer ring 18 to the bearing support 20. This attachment assembly comprises an annular attachment flange 30, for example fixed by means of bolts 31 to the annular flange 24 of the bearing support, and a flexible part 32, elastically deformable. The flexible part 32 comprises arms 33, 34 spaced circumferentially relative to each other, and an annular base 35 connected to the first arms 33 and the second arms 34. The flexible part 32 extends overall downstream.

More precisely, the flexible part 32 comprises first arms 33 starting out from the attachment flange 30 in a first direction with a first radial component towards the interior in the direction of the axis 13, and extending from the attachment flange 30 as far as the annular base 35. The flexible part also comprises second arms 34 starting out from the outer ring 18 of the rolling bearing in a second direction with a second radial component opposite the first radial component, to the outside relative to the axis 13, and extending as far as the annular base 35.

Attachments of second arms 34 on the annular base 35 are radially more external relative to the axis 13 than attachments of first arms 33 on the annular base 35. In a similar way, attachments of first arms 33 on the annular base 35 are radially more internal relative to the axis 13 than attachments of second arms 34 on the annular base 35.

Now, the outer ring 18 of the rolling bearing from which the first arms 33 start out is radially more internal (i.e. closest to the axis 13) than the support 20 (and more precisely the annular flange 24 of this support 20) from which the second arms 34 start out. The result is that to invert their radial order, the first arms 33 cross the second arms 34, as seen in FIG. 1. Because of this, the first arms 33 face the outer ring 18 of the rolling bearing, and the second arms 34 face the attachment flange 30, in the axial direction.

To achieve this, the first arms 33 comprise a first part 33a having a first connection interface 36 connecting said first arms 33 to the attachment flange 30 and extending in a radially internal direction relative to the axis 13, that is, in the direction of the axis 13, and facing the outer ring 18 of the rolling bearing in the axial direction. The first arms 33 also comprise a second part 33b bent extending the first part 33a, forming an inflection for the direction of extension of the first arms 33. In the axial direction this second part 33b preferably faces the outer ring 18. The first arms 33 finally comprise a third part 33c extending the second part 33b and connecting to a radially internal part 37 of the annular base 35. By comparison with the first part 33a, this third part 33c extends in a less radially internal direction relative to the axis 13, due to the bent appearance of the second part 33b. Preferably, the third part 33c extends in an essentially axial direction, as in FIG. 1, or in a radially external direction, opposite the direction of the first part 33a.

The second arms 34 comprise a first part 34a having a first connection interface 38 connecting said second arms to the outer ring 18 of the rolling bearing and extending in a radially external direction relative to the axis 13 opposite the attachment flange 30. The second arms 34 also comprise a second bent part 34b extending the first part 34a, forming an inflection for the direction of extension of the second arms 34. In the axial direction this second part 34b preferably faces the support 20. The second arms 34 finally comprise a third part 34c extending the second part 34b and connecting to a radially external part 39 of the annular base 35. By comparison with the first part 34a, this third part 34c extends in a less radially external direction relative to the axis 13, due to the bent appearance of the second part 34b. Preferably, the third part 34c extends in an essentially axial direction, as in FIG. 1, or in a radially internal direction, opposite the direction of the first part 34a.

The form of the arms 33, 34 produces a long length for suspension of the rolling bearing on the bearing support 20, greater than the length of the U-shaped arms of the prior art for the same bulkiness. Because of this increased length, flexibility of the suspension is augmented and constraints on the arms 33, 34 are reduced. It is also possible to reduce the axial bulkiness while keeping the required flexibility.

Also, the first arms 33 alternate with the second arms 34 along a circumference of the annular assembly. Preferably, in describing the circumference of the annular assembly, each first arm 33 alternates with a second arm 34, as clearly seen in FIG. 3. Yet it is possible to select less regular or less systematic alternation. For example, it is possible to have assemblies of two adjacent first arms 33 spaced apart by a second arm 34. Preferably, there are as many first arms 33 as second arms 34. Preferably also, each first arm 33 is adjacent to two of the second arms 34 and each second arm 34 is adjacent to two of the first arms 33.

This alternation between first arms 33 and second arms 34, which therefore forms interlacing of arms 33, 34, ensures axial retention in both directions and anti-rotation of the rolling bearing even in the event of breaking of arms 33, 34. FIG. 2 shows an example of configuration wherein a first arm 33 and a second arm 34 are broken. Only the first part 33a of the first arm 33 and the first part 34a of the second arm 34 remain.

As the first part 34a of the second arm 34 extends from the outer ring 18 in a direction radially to the outside, this first part 34a extends in front of the attachment flange 30, which is attached to the support 20. The attachment flange 30 forms a stop surface 50 towards the front for the first part 34a of the second arm 34 to prevent displacement upstream of the outer ring 18 to which this first part 34a of the second arm 34 is attached. As the first part 33a of the first arm 33 extends from the attachment flange 30 in a direction radially towards the interior, this first part 33a extends in front of the outer ring 18. The outer ring 18 forms a rear stop surface 52 for the first part 33a of the first arm 33, preventing displacement of this outer ring 18 downstream.

Since the arms 33, 34 prevent displacement of the rolling bearing it is no longer necessary to provide attached mechanical devices such as an axial retaining plate or fretted retaining pins. It is therefore possible to reduce the bulkiness, especially axial, and the weight of the device.

It is also possible to reduce the radial bulkiness of the attachment flange 30. Whereas previously centring of the attachment flange was placed facing the annular flange 24 of the bearing support 20, freeing up the upstream part 26 of the bearing support 20, centring of the attachment flange 30 is now placed radially more towards the interior and now faces this upstream part 26 of the bearing support 20. Centring of the bearing on the bearing support 20 is done inside the attachment flange 30, and no longer outside.

The attachment flange 30 comprises an annular frame 54 facing (in the axial direction) the upstream part 26 and the retaining ring 28. It is to this annular frame 54 that the connection interfaces 36 of the first parts 33a of the first arms 33 are connected. The annular frame 54 forms an axial stop of the retaining ring 28 in the direction of the axis 13 and prevents axial displacement of the retaining ring 28 mounted in the bearing support 20 in case of accidental loss of grip between the retaining ring 28 and the bearing support 20. Preferably, and as seen in FIGS. 1 and 2, the annular frame has a groove 56 projecting in the axial direction upstream and engaging in a space 58 delimited between the upstream part 26 of the support 20 and the retaining ring 28.

Figure 4:
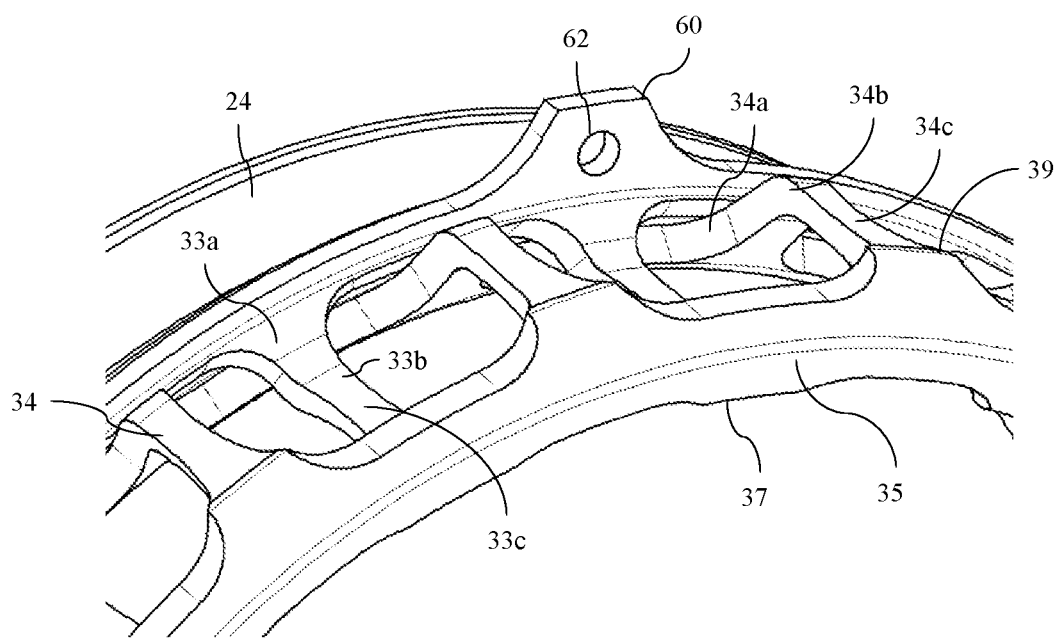
FIG. 4 is a view on a larger scale of the detail II of FIG. 3.

Centring of the bearing on the bearing support 20 inside the attachment flange 30 allows scalloping the attachment flange 30 between the fastening points, that is, places scalloped cuts between the attachment areas 60 which now project to the outside relative to the annular frame 54, as illustrated in FIGS. 3 and 4. The annular frame 54 is therefore provided with attachment areas 60 projecting radially to the outside relative to the axis 13, the attachment areas 60 comprising holes 62 for fastening of the attachment flange 30 to the bearing support 20, and in particular for passing through bolts 31. Preferably, the attachment flange 30 comprises more than three attachment areas 60, and preferably these attachment areas 60 are distributed uniformly over the circumference of the attachment flange 30.

As is seen in FIG. 4, an attachment area 60 projects in the region of a first arm 33 and between two second arms 34, seen in the direction of the axis 13. More precisely, an attachment area 60 projects to the right (to the outside) of a first arm 33 since the latter leaves the downstream space disengaged for passing through of the bolt 31 in the hole 62 of the attachment area 60, due to the fact that the first arm 33 starts out from the attachment flange 30 in a direction with a first radial component towards the interior in the direction of the axis 13. In the same way, this configuration of the first arm 33 leaves sufficient space for a tool for fastening the bolt 31 to pass through.

Due to scalloping of the attachment flange 30, the supply tubes have no more need to cross the attachment flange 30, and there is no more need to make holes for this purpose. The supply tubes here take the form of a tube 64 placed outside the annular frame 54 between the projections of two adjacent attachment areas 60.

Relative to the prior art, the reduced diameter of the attachment flange 30 (due to its positioning closer to the axis 13), the scalloping of the attachment flange 30, and the absence of an axial retaining plate or fretted retaining pins, reduce the weight of the device by over a kilogram.

Preferably, the different components of the flexible part, that is, the annular base 35, the first arms 33 and the second arms 34, are made of material, being formed from the same material. Preferably, this material is tempered steel.

Preferably, the flexible part 32 is made by additive manufacturing, by adding material, and especially by stacking of successive layers, as in the case of three-dimensional printing. Any type of additive manufacturing for obtaining an elastically deformable flexible material adapted to respond to the demands of the function fulfilled by the flexible part. Making the flexible part 32 can comprise the assembling of a sub-part made by additive manufacturing, each sub-part comprising at least a first arm 33 and at least a second arm 34. Additive manufacturing reduces the radial height of the flexible part 32 relative to the prior art because this radial height is no longer conditional on the need for accessibility for a machining tool of the U-shaped internal space of the flexible parts such as described for example in the application WO 2015/079156.

The invention is not limited to the embodiment described and shown in the attached figures. Modifications are still possible, especially from the viewpoint of the constitution of various elements or by substitution of technical equivalents, without departing from the protective scope of the invention.

The invention claimed is:

1. A device for centring and guiding in rotation a rotating part around an axis of a turbomachine, comprising
a rolling bearing comprising an outer ring radially to the outside relative to the axis;
a bearing support radially to the outside and enclosing the outer ring;
an annular attachment assembly of the outer ring on the bearing support, the attachment assembly comprising an annular attachment flange mounted on the bearing support and a flexible part connecting the outer ring to the attachment flange,
the flexible part comprising:
first arms starting out from the attachment flange in a first direction with a first radial component towards the interior in the direction of the axis;
second arms starting out from the outer ring of the rolling bearing in a second direction with a second radial component opposite the first radial component, to the outside;
an annular base connected to the first arms and the second arms,
the first arms alternating circumferentially with the second arms,
wherein the first arms face the outer ring of the rolling bearing in an axial direction, and the second arms face the attachment flange in an axial direction,
wherein attachments of the second arms on the annular base are radially more external relative to the axis than attachments of the first arms on the annular base.

2. The device as claimed in claim 1, wherein the first arms comprise a first part having a first connection interface connecting said first arms to the attachment flange and extending in a radially internal direction relative to the axis and facing the outer ring of the rolling bearing, a second bent part extending the first part, and a third part extending the second part and connecting to a radially internal part of the annular base.

3. The device as claimed in claim 1, wherein the second arms comprise a first part having a first connection interface connecting said second arms to the outer ring of the rolling bearing and extending in a radially external direction relative to the axis and facing the attachment flange, a second bent part extending the first part, and a third part extending the second part and connecting to a radially internal part of the annular base.

4. The device as claimed in claim 1, wherein along circumference of the annular assembly, each first arm is adjacent to two of the second arms and each second arm is adjacent to two of the first arms.

5. The device as claimed in claim 1, wherein the attachment flange comprises an annular frame provided with attachment areas projecting radially to the outside relative to the axis, the attachment areas comprising holes for fastening of the attachment flange on the bearing support.

6. The device as claimed in claim 5, wherein a supply tube is placed outside the annular frame between the projections of two adjacent ones of the attachment areas.

7. The device as claimed in claim 1, comprising a retaining ring interposed between the outer ring and the bearing support, and the attachment flange comprises an annular frame, said annular frame forming an axial stop of the retaining ring in the direction of the axis.

8. A turbomachine comprising a device for centring and guiding in rotation a rotating part around an axis of a turbomachine, the device comprising
a rolling bearing comprising an outer ring radially to the outside relative to the axis;
a bearing support radially to the outside and enclosing the outer ring;
an annular attachment assembly of the outer ring on the bearing support, the attachment assembly comprising an annular attachment flange mounted on the bearing support and a flexible part connecting the outer ring to the attachment flange,
the flexible part comprising:
first arms starting out from the attachment flange in a first direction with a first radial component towards the interior in the direction of the axis;
second arms starting out from the outer ring of the rolling bearing in a second direction with a second radial component opposite the first radial component, to the outside;
an annular base connected to the first arms and the second arms,
the first arms alternating circumferentially with the second arms,
wherein the first arms face the outer ring of the rolling bearing in an axial direction, and the second arms face the attachment flange in an axial direction, and
wherein attachments of second arms on the annular base are radially more external relative to the axis than attachments of first arms on the annular base.

9. A process for manufacturing a device for centring and guiding in rotation a rotating part around an axis of a turbomachine, the device comprising
a rolling bearing comprising an outer ring radially to the outside relative to the axis;
a bearing support radially to the outside and enclosing the outer ring;
an annular attachment assembly of the outer ring on the bearing support, the attachment assembly comprising an annular attachment flange mounted on the bearing support and a flexible part connecting the outer ring to the attachment flange, the flexible part comprising:
- first arms starting out from the attachment flange in a first direction with a first radial component towards the interior in the direction of the axis;
- second arms starting out from the outer ring of the rolling bearing in a second direction with a second radial component opposite the first radial component, to the outside;
- an annular base connected to the first arms and the second arms, the first arms alternating circumferentially with the second arms, wherein the first arms face the outer ring of the rolling bearing in an axial direction, and the second arms face the attachment flange in an axial direction,
- wherein the process comprises producing the flexible part by additive manufacturing, and
- wherein attachments of second arms on the annular base are radially more external relative to the axis than attachments of first arms on the annular base.

\* \* \* \* \*